US012598658B2

(12) United States Patent
Paila et al.

(10) Patent No.: US 12,598,658 B2
(45) Date of Patent: Apr. 7, 2026

(54) SYSTEMS AND METHODS FOR WIRELESSLY PAIRING MEDICAL DEVICES

(71) Applicant: GE Precision Healthcare LLC, Wauwatosa, WI (US)

(72) Inventors: Antti Paila, Helsinki (FI); Sakari Matias Lamminmaki, Espoo (FI); Antte-Ville Samuli Kaukonen, Helsinki (FI); Juho Viljami Routakorpi, Helsinki (FI); Juha Petri Virtanen, Helsinki (FI); Ville Petteri Vartiovaara, Helsinki (FI); Lauri Tapio Aarnio, Helsinki (FI)

(73) Assignee: GE Precision Healthcare LLC, Wauwatosa, WI (US)

( * ) Notice: Subject to any disclaimer, the term of this patent is extended or adjusted under 35 U.S.C. 154(b) by 693 days.

(21) Appl. No.: 17/899,396

(22) Filed: Aug. 30, 2022

(65) Prior Publication Data

US 2024/0073977 A1     Feb. 29, 2024

(51) Int. Cl.
*H04W 76/14*          (2018.01)
*H04W 52/24*          (2009.01)

(52) U.S. Cl.
CPC ......... *H04W 76/14* (2018.02); *H04W 52/245* (2013.01)

(58) Field of Classification Search
CPC .................................................. H04W 76/14
See application file for complete search history.

(56) References Cited

U.S. PATENT DOCUMENTS

| | | | |
|---|---|---|---|
| 7,174,130 | B2 | 2/2007 | Kurisko |
| 7,848,703 | B1 | 12/2010 | Beard |
| 8,364,963 | B2 | 1/2013 | Lind |
| 9,173,992 | B2 | 11/2015 | Bengtsson |
| 9,503,878 | B2 | 11/2016 | Alexander |
| 9,831,985 | B2 | 11/2017 | Sicurello |
| 10,327,706 | B2 | 6/2019 | Yarger |
| 10,383,527 | B2 | 8/2019 | Al-Ali |
| 10,571,999 | B2 | 2/2020 | Tanaka |

(Continued)

FOREIGN PATENT DOCUMENTS

| | | |
|---|---|---|
| WO | 2007060638 A2 | 5/2007 |
| WO | 2020077149 A1 | 4/2020 |

OTHER PUBLICATIONS

EP application 23191054.8 filed Aug. 11, 2023—extended Search Report issued Feb. 13, 2024; 10 pages.

*Primary Examiner* — Pamit Kaur

(57)          ABSTRACT

A method of wireless pairing electronic devices includes: receiving a pairing request; transmitting, a first wildcard token via radio communication; searching for a pre-shared token; searching for the wildcard token via radio communication; establishing a wireless connection with a first device via radio communication based on the first wildcard token in response to receiving information including the first wildcard token from the first device; establishing a wireless connection with a second device via radio communication based on the pre-shared token in response to receiving information including the pre-shared token from the second device; and establishing radio communication at a second power level in response to initiating pairing with one or more of the first device and the second device.

14 Claims, 12 Drawing Sheets

(56)          References Cited

U.S. PATENT DOCUMENTS

| | | | | |
|---|---|---|---|---|
| 2011/0070837 A1* | 3/2011 | Griffin | .................... | H04B 5/00 |
| | | | | 455/41.3 |
| 2011/0210820 A1 | 9/2011 | Talty | | |
| 2013/0082821 A1 | 4/2013 | Bousamra | | |
| 2013/0171939 A1* | 7/2013 | Tian | .................... | H04W 12/04 |
| | | | | 455/41.2 |

* cited by examiner

Generate, by a first device, an NFC token 402

Move first and second devices to within near field communication range 404

Send, from the first device to the second device, the NFC token using NFC communications 406

Pair the first device and the second device using radio communications based on the NFC token 408

Transfer data between the first device and the second device 410

NFC Based Pairing

HUB                                                    Wireless Sensor

FIG. 4B

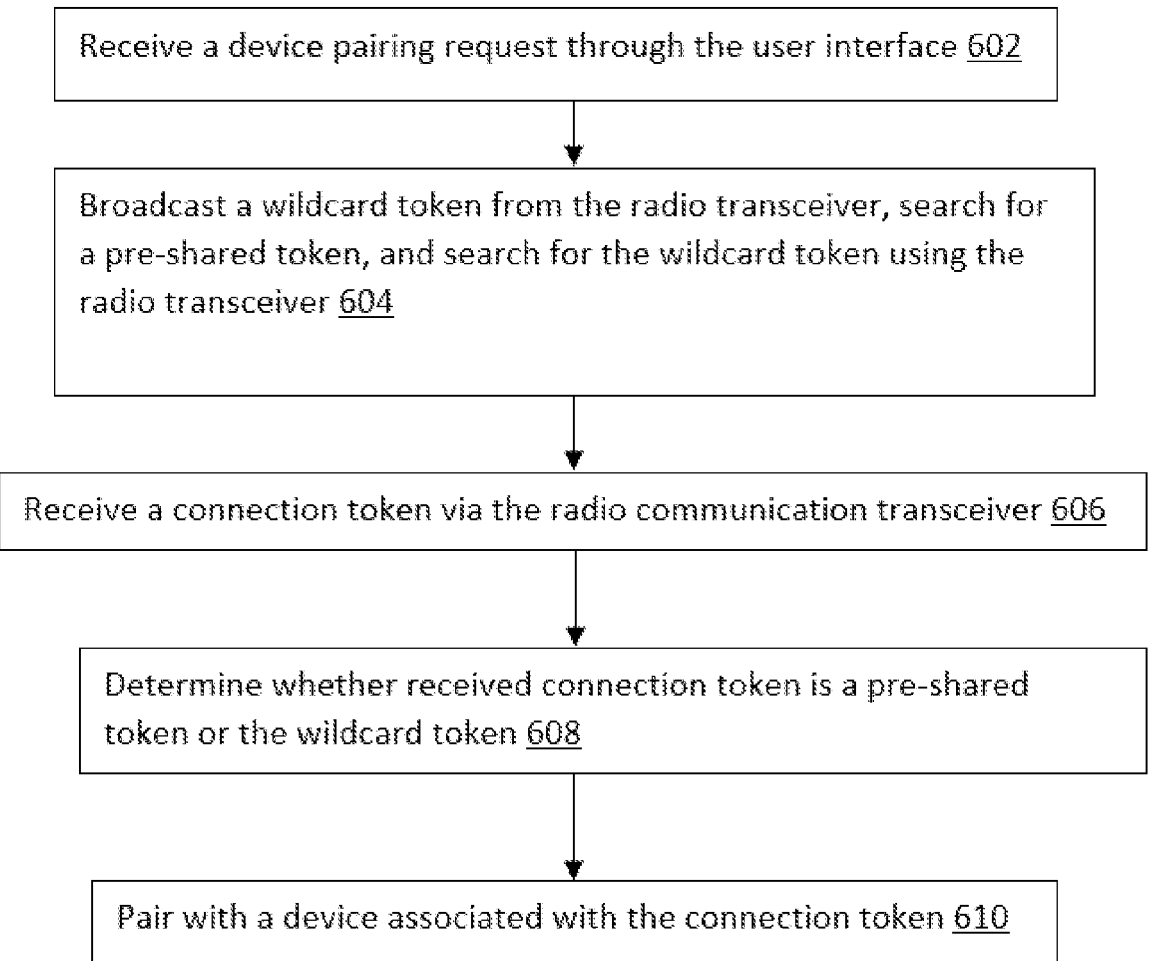

Receive a device pairing request through the user interface 602

Broadcast a wildcard token from the radio transceiver, search for a pre-shared token, and search for the wildcard token using the radio transceiver 604

Receive a connection token via the radio communication transceiver 606

Determine whether received connection token is a pre-shared token or the wildcard token 608

Pair with a device associated with the connection token 610

FIG. 6

SYSTEMS AND METHODS FOR WIRELESSLY PAIRING MEDICAL DEVICES

BACKGROUND

This disclosure generally relates to the field of patient monitoring and, more particularly to a system and apparatus supporting multiple means to pair wireless devices.

Conventional physiological measurement systems are limited by the patient cable connection between sensor and monitor. A patient must be located in the immediate vicinity of the monitor. Also, patient relocation requires either disconnection of monitoring equipment and a corresponding loss of measurements or an awkward simultaneous movement of patient equipment and cables. Various devices have been proposed or implemented to provide wireless communication links between sensors and monitors, freeing patients from the patient cable tether.

In many cases, a medical environment may have many different wireless sensors and devices. As such, it may be difficult to pair an intended device when other wireless devices are in close proximity. Further, each wireless device may have different capabilities providing for different connection techniques. It is desired to have a system in which any selected wireless device can be paired in an efficient manner using a single workflow.

BRIEF DESCRIPTION

This Brief Description is provided to introduce a selection of concepts that are further described below in the Detailed Description. This Summary is not intended to identify key or essential features of the claimed subject matter, nor is it intended to be used as an aid in limiting the scope of the claimed subject matter.

According to aspect of the disclosure, an electronic device may include a radio communication transceiver; a memory storing instructions; and at least one processor configured to execute the instructions to: transmit a first wildcard token from the radio communication transceiver at a first power level, search for a pre-shared token, and search for the wildcard token using the radio communication transceiver; responsive to receiving information corresponding to the first wildcard token from a first device, pairing with the first device via radio communication based on the information corresponding to the first wildcard token; responsive to receiving information corresponding to the pre-shared token from a second device, pairing with the second device via radio communication based on the information corresponding to the pre-shared token; and based on pairing with one or more of the first device and the second device, establish radio communication via the radio communication transceiver at a second power level.

According to another aspect of the disclosure, a method of wireless pairing electronic devices may include transmitting a first wildcard token via radio communication; searching for a pre-shared token; searching for the wildcard token via radio communication; establishing a wireless connection with a first device via radio communication based on the first wildcard token in response to receiving information corresponding to the first wildcard token from the first device; establishing a wireless connection with a second device via radio communication based on the pre-shared token in response to receiving information corresponding to the pre-shared token from the second device.

According to yet another aspect of the disclosure, a patient monitoring system supporting multiple methods of wirelessly pairing with a physiological sensor to establish wireless communication for physiological data may include a patient monitoring device configured to wirelessly communicate with medical devices, the patient monitor comprising a processor; a first sensor configured to collect physiological data from a patient, the first sensor comprising: a sensor element; a battery; a near field communication circuit configured to exchange pairing related information with a patient monitoring device when the first sensor is brought within a first range of the patient monitoring device; and a radio communication transceiver circuit configured to wirelessly send physiological data to the patient monitoring device once the first sensor is paired with the patient monitoring device; and a second sensor configured to collect physiological data from a patient, the second sensor comprising: a sensor element; a battery; and a radio communication transceiver configured to: exchange pairing related information with the patient monitoring device in response to the second sensor being brought within a second range of the patient monitoring device when the second sensor is unpaired with the patient monitoring device; and send physiological data to a patient monitor once the second sensor is paired with the patient monitoring device, wherein the at least one processor of the patient monitoring device is configured to: control a near field communication transceiver to exchange pairing related information with the first sensor; control the radio communication transceiver to: exchange pairing related information with second sensor; and receive physiological sensor measurement data from the first and second group of sensor assemblies.

BRIEF DESCRIPTION OF THE DRAWINGS

The present disclosure is described with reference to the following Figures.

FIG. 4B is diagram showing a process of the first and the second device pairing based on the pre-shared token communicated using NFC, according to an aspect of the disclosure.

FIG. 6 is a flowchart of a process of pairing wireless patient monitoring sensors having different connection methods with a patient monitoring hub using a single workflow, according to an aspect of the disclosure.

DETAILED DESCRIPTION

Figure 1:
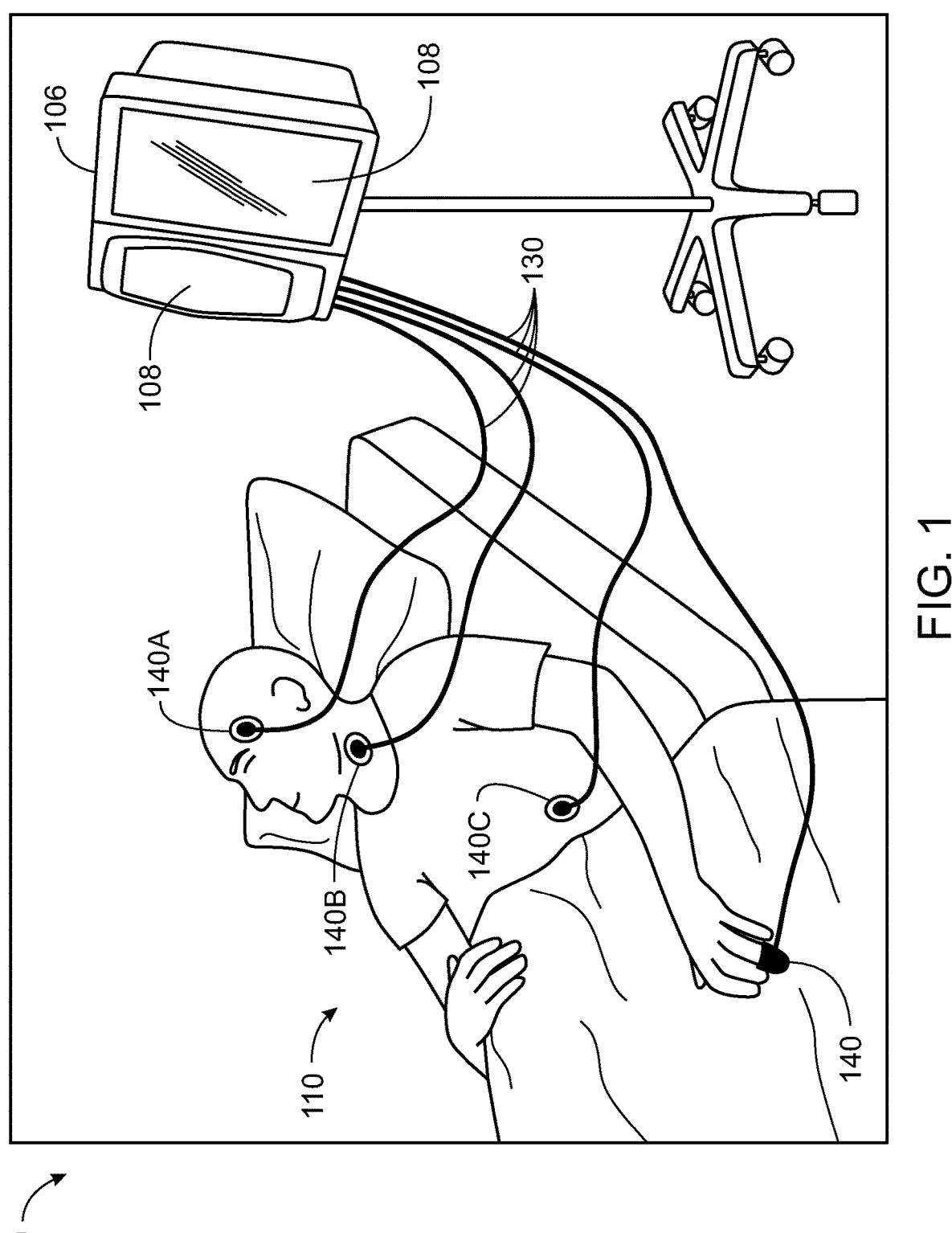
FIG. 1 shows an exemplary patient monitoring system for monitoring a patient, according to an aspect of the disclosure.

Wired solution for sensors may be cumbersome and difficult to manage when there are multiple sensors attached to a patient as shown in FIG. 1. For example, the cable for the sensors can be tangled and damaged after repeated use. Moreover, since the sensors are tethered to a patient health monitor, patients have to be located proximate to the health monitor and movement of the patients can be limited. If a longer cable is required, the sensor and the cable have to be replaced together. Similarly, the sensors being tethered to the monitor can make transportation of the patient very difficult as it would require the patient to remain close to the monitor during transportation or disconnecting the sensors which would result in loss of measurements.

FIG. 1 shows an example of a patient monitoring system 100 including a patient monitoring hub 106 coupled sensors 140A, 140B, 140C, 140D via cables 130, where the sensors are attached to a patient 110. The patient monitoring hub 106 can include a display 108 that can display various physiological parameters. The sensors 140A, 140B, 140C, 140D can collect various types of physiological data from the patient 110 and transmit the data to the patient monitoring hub 106 via the cable 130.

However, the cables 130 can be cumbersome to the patient and prone to tangling. The cables 130 can develop kinks and be damaged over time. In addition, because the sensors 140 A, 140B, 140C, 140D are connected to the patient monitoring hub 106 via the cables 130, location of the patient monitoring hub 106 can be restricted to the lengths of the cables 130 attached to the sensors 140A, 140B, 140C, 140D. The cables 130 can also restrict patient movements. Therefore, a wireless solution including wireless communication capacity between the sensors and the computing device may resolve some of the concerns of the wired configuration. The wireless configuration can eliminate the need of the cables 130 between the sensors and the computing device and thus provide greater patient mobility.

The inventor has recognized that given the prevalence of different patient monitoring devices and wireless connection methods, a single workflow for connecting all of these devices will simplify a care team member's workload, thus increasing efficiency and safety. Patient monitoring devices may fall into different categories, such as disposable and reusable. Devices in each of these categories may be design in view of different constrains, and therefore may use different pairing methods. For example, since cost is less of a factor for a reusable device, a near field communication (NFC) transceiver and a radio receiver may both be included without substantially affecting price per use of the device. In contrast, adding an NFC transceiver to a disposable device may significantly increase the price per use of the device since the device is only used once. Other factors influencing how monitoring devices are designed to pair wirelessly may include component/device size, ease of manufacturing, power consumption, among others.

In many cases, a member of the care team may wirelessly pair one or more patient monitoring devices to a patient monitoring hub (e.g. a bedside monitor or a telemetry monitoring device). Due to the amount of different patient monitoring devices and their different pairing techniques, it may be very difficult for the care team member to correctly and efficiently connect a patient monitoring device to a patient monitoring hub. This is especially the case when multiple patient monitoring device are in the vicinity and trying to simultaneously connect the patient monitoring hub.

Figure 2:
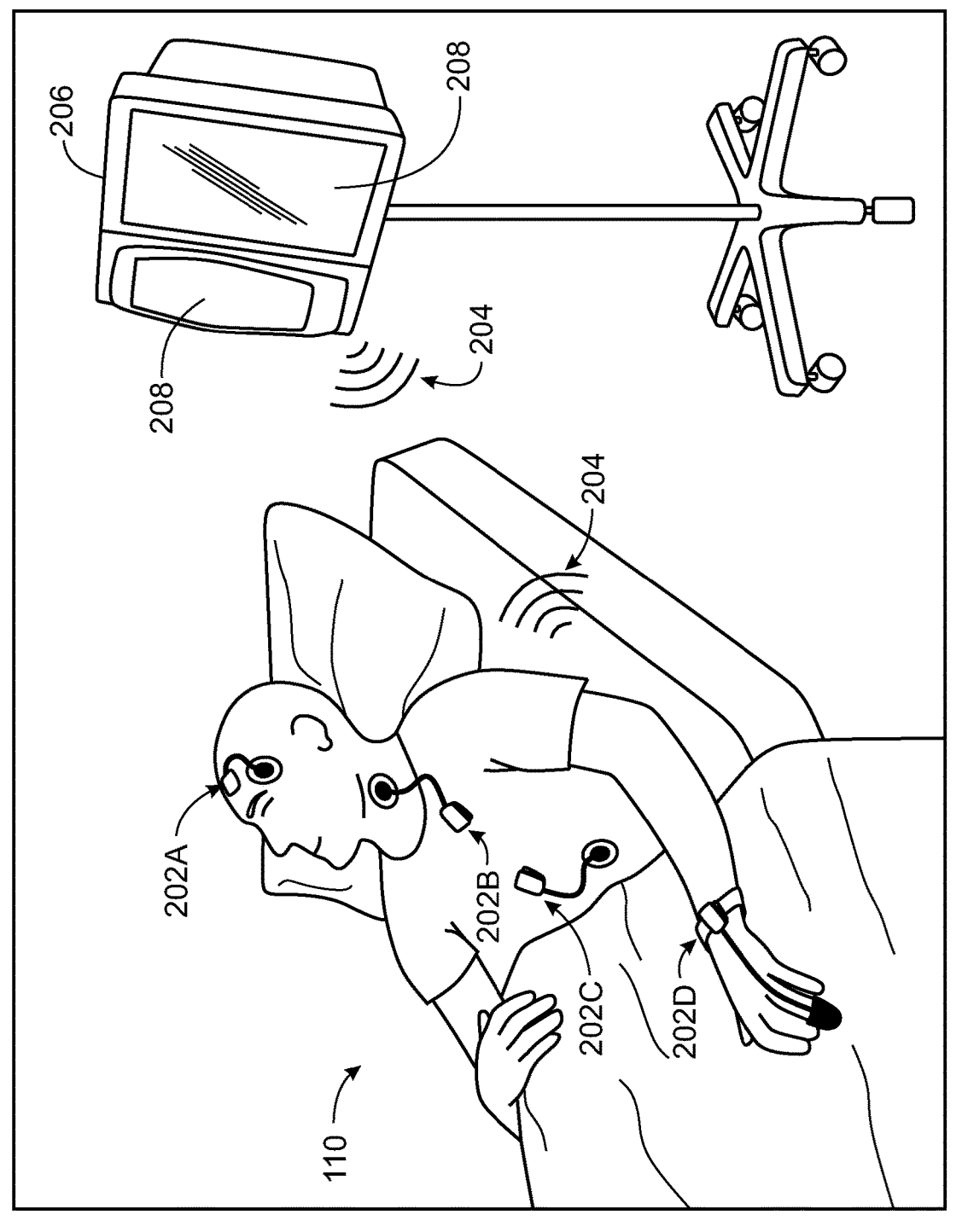
FIG. 2 shows another example of a patient monitoring system for monitoring a patient, according to an aspect of the disclosure.

FIG. 2 shows an exemplary patient monitoring system 200 for monitoring a patient. In the example shown in FIG. 2, the patient monitoring system 200 includes a patient monitoring hub 206 and multiple wireless patient monitoring sensors 202A, 202B, 202C, 202D. According to an aspect of the disclosure, the patient monitoring hub 206 may have an NFC transceiver as well as a radio transceiver, sensors 202B and 202C may have an NFC transceiver as well as a radio transceiver, while sensors 202A and 202D may only have a radio transceiver. Since these sensors have different hardware, they may use different pairing techniques for pairing to the patient monitoring hub 206. The patient monitoring system 200 may provide a similar workflow for connecting any of the patient monitoring sensors 202A, 202B, 202C, and 202D which may connect using different techniques based on their available hardware. Some examples of the sensors 202A, 202B, 202C, 202D include, but not limited to, regional Oximetry sensor, SpO2 sensor, a blood pressure sensor, an ECG sensor, a hemoglobin sensor, an EEG sensor, a motion sensor, a respiration rate sensor, and the like.

Figure 3A:
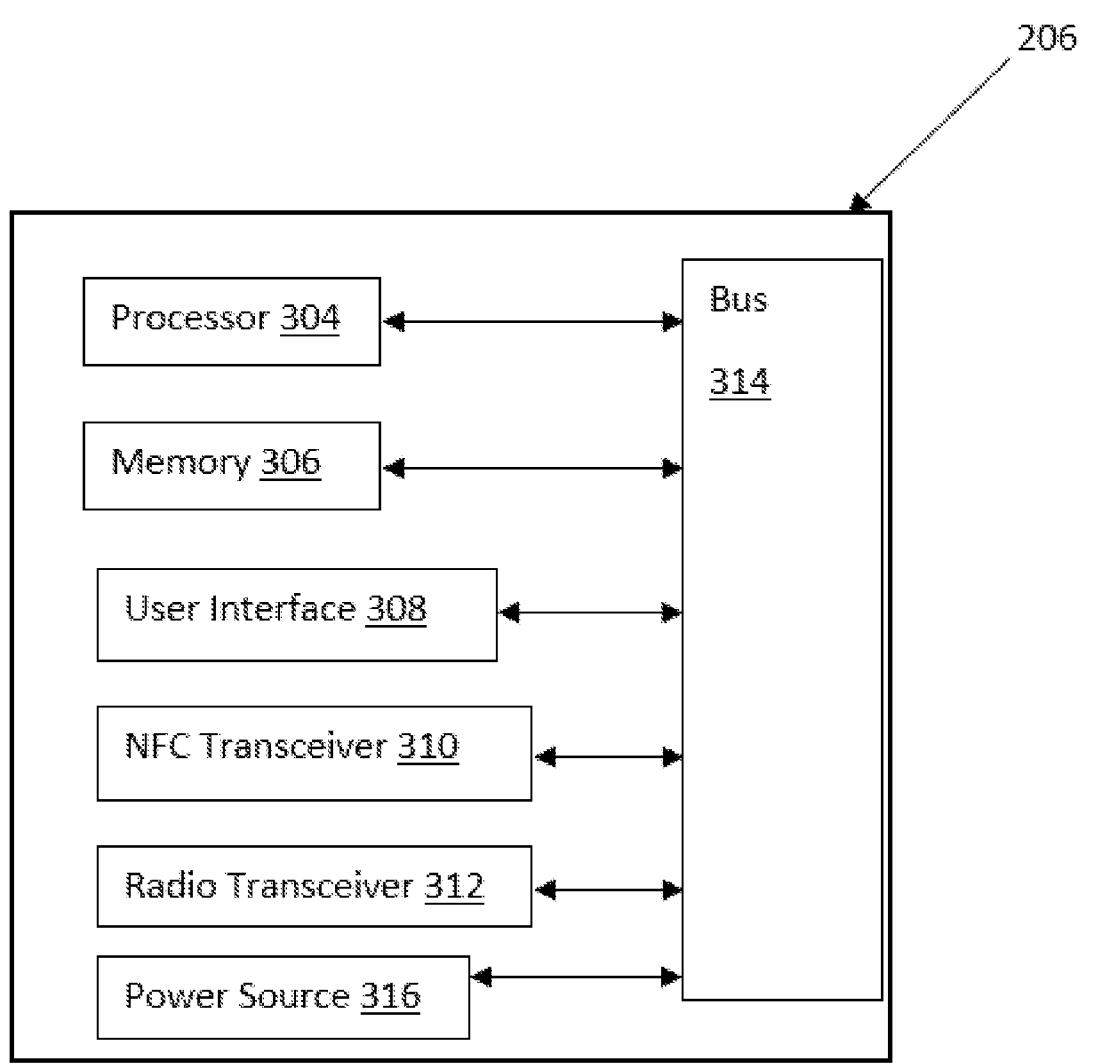
FIG. 3A is a system diagram of a patient monitoring hub, according to an aspect of the disclosure.

FIG. 3A is a system diagram of a patient monitoring hub 206, according to an example. As shown in FIG. 3A, the patient monitoring hub 206 may include a processor 304, a memory 306, a user interface 308, a NFC transceiver 310, and a radio transceiver 312, a bus 314, and a power source 316.

The bus 314 may include a circuit for connecting the components 304 through 312 with one another and transferring communications (e.g., control messages and/or data) between the components. The power source 316 may provide the hub with electricity. For example, the power source may be a battery or a wired DC converted.

The processing module 304 may include one or more of a central processing unit (CPU), an application processor (AP), or a communication processor (CP). The processor 304 may perform control on at least one of the other components of the hub 206, and/or perform an operation or data processing relating to communication.

The memory 306 may include a volatile and/or nonvolatile memory. For example, the memory 306 may store commands or data related to at least one other component of the hub 206. According to an embodiment, the memory 306 may store software and/or a program.

The user interface 308 may serve as an interface that may, e.g., transfer commands or data input from a user or other external devices to other component(s) of the hub 206. Further, the user interface 308 may output commands or data received from other component(s) of the hub 206 to the user or the other external devices.

The user interface may include a display, such as a liquid crystal display (LCD), a light emitting diode (LED) display, an organic light emitting diode (OLED) display, or a microelectromechanical systems (MEMS) display, or an electronic paper display. The display may display, e.g., various contents (e.g., text, images, videos, icons, or symbols) to the user. The display may include a touchscreen and may receive, e.g., a touch, gesture, proximity or hovering input using an electronic pen or a body portion of the user.

The radio transceiver 312 may be used to communicate between the hub 206 and an external wireless devices device (e.g., sensors 202A, 202B, 202C, 202D) using radio waves. For example, the radio transceiver 312 may also connected with the network 204 through wireless to communicate with the external electronic devices. The radio transceiver may produce and receive radio waves for wirelessly communicating. The radio transceiver may produce electromagnetic waves of the frequency between 30 hertz to 300 gigahertz. For example, the radio transceiver may be used to communication using Bluetooth®, wifi, and a medical body area network (MBAN) protocols, as well as other known communication protocols.

The near field communication (NFC) transceiver 310 may be used to communicate between the hub 206 and an external wireless device (e.g. sensors 202B and 202C). The NFC transceiver communicates by inductively coupling with another NFC transceiver to transmit data.

According to an aspect of the disclosure, the NFC transceiver 310 and the radio transceiver 312 may be a single component capable of handling both types of communication.

Figure 3B:
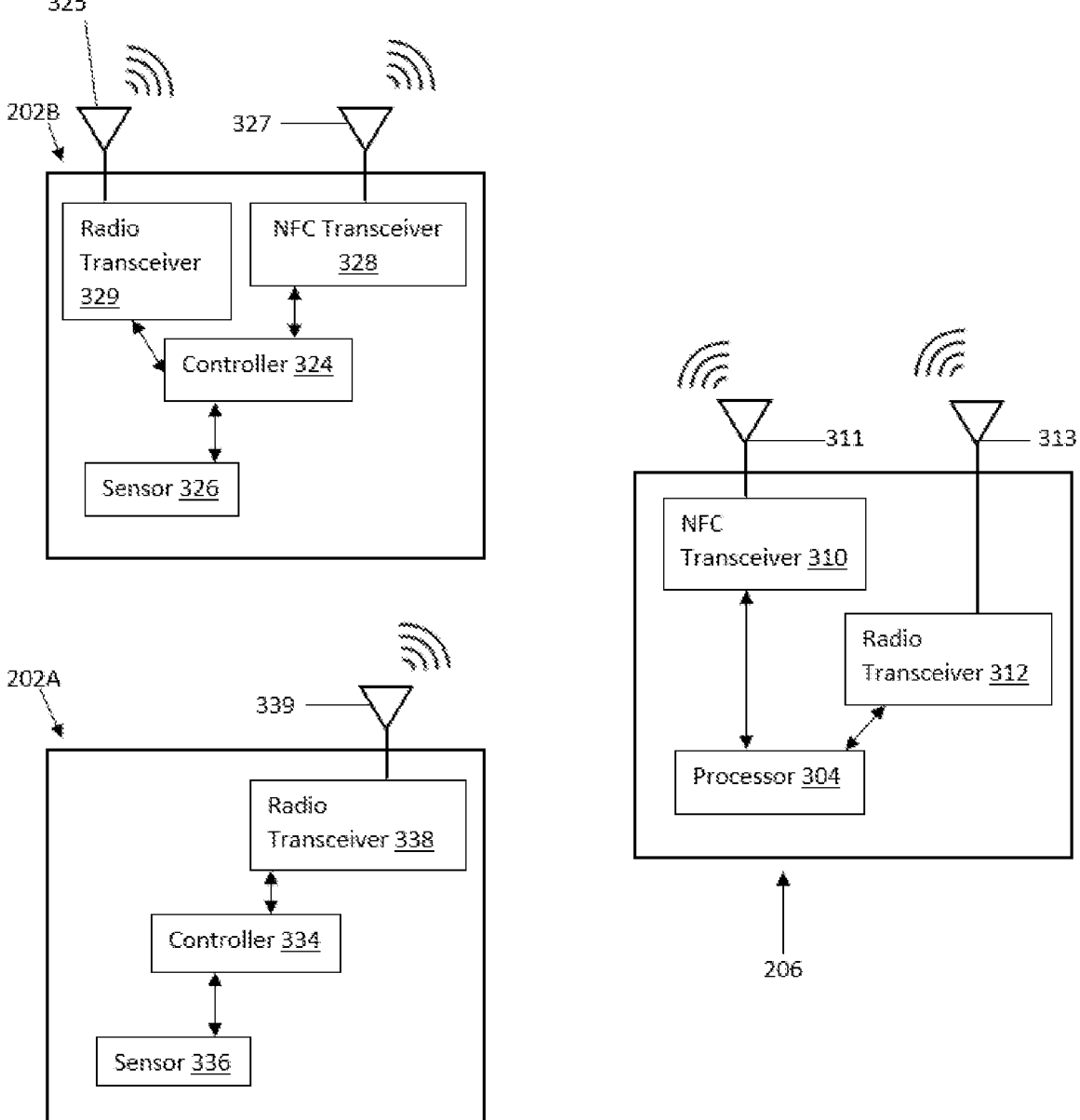
FIG. 3B is a system diagram of a patient monitoring system, according to an aspect of the disclosure.

FIG. 3B is a system diagram of a patient monitoring system 200, according to an example. As shown in FIG. 3B, the environment may include the hub 206, a first wireless device 202A, and a second wireless device 202B.

The first device 202A may include a sensor 336, a controller 334, a radio transceiver 338, and a radio antenna 339. The second device 202B may include a sensor 326, a controller 324, a radio transceiver 329, a radio antenna 325, an NFC transceiver 328, and an NFC antenna 327. Each of the first device and second device may include a power source such as a battery for providing portable power for the devices. According to an example, the first device 202A may be a disposable device in which is it not economically feasible to include a NFC transmitter while the second device 202B is a reusable device in which inclusion of an NFC transmitter is economically feasible.

As shown in FIG. 3B each of the first device 202A and second device 202B can communicate with the hub 206 via radio communication. Each of the first device 202A, second device 202B, and hub 206 may adjust their radio transmission power level as well as their received signal strength threshold. The second device 202B may also communicate with the hub via NFC.

Exemplary embodiments described herein are not meant to be limiting and merely illustrative of various aspects of the invention. While exemplary embodiments may be indicated as applicable to a particular device category (e.g., physiological sensor, etc.) the processes and examples provided are not intended to be solely limited to the device category and can be broadly applicable to various device categories (e.g., appliances, computers, automobiles, etc.). According to a non-limiting embodiment, an electronic device may include a smartphone, an augmented reality device, a smart speaker, a personal computer, a tablet computer, or any device connected to the internet of things.

The method of wirelessly pairing may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to an electronic device, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The method of wirelessly pairing may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of a server.

Figure 4A:
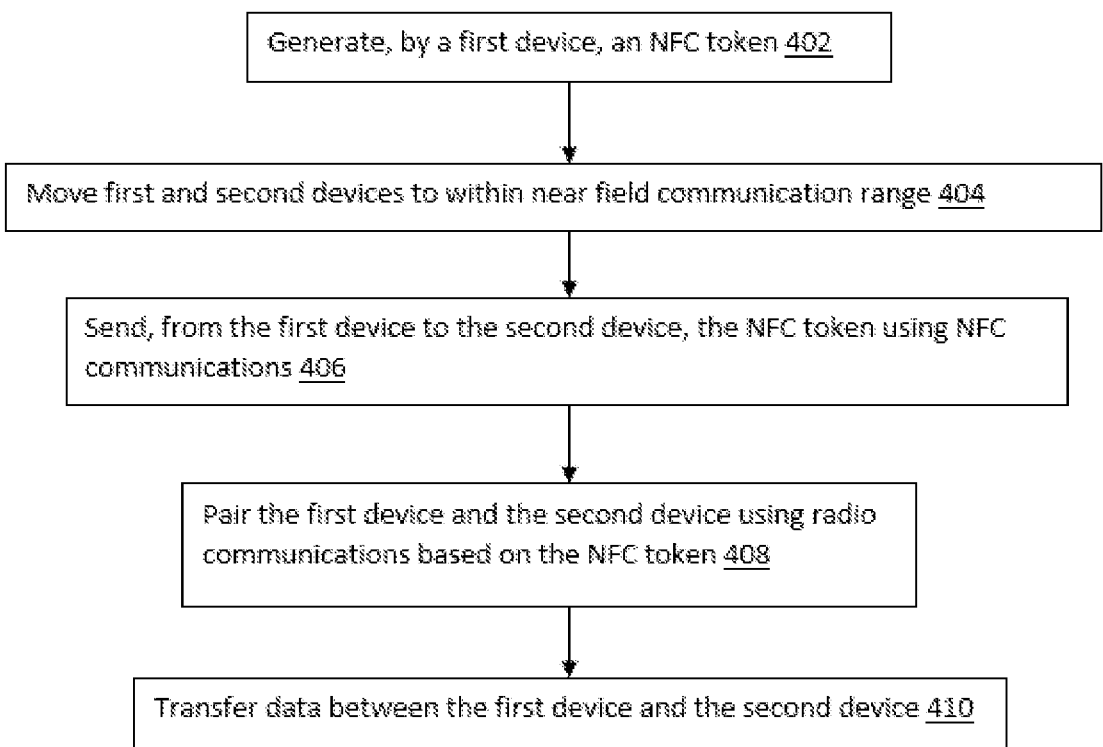
FIG. 4A is a flowchart of a process of pairing a first and a second device based on a pre-shared token communicated using NFC, according to an aspect of the disclosure.
Figure 4B:
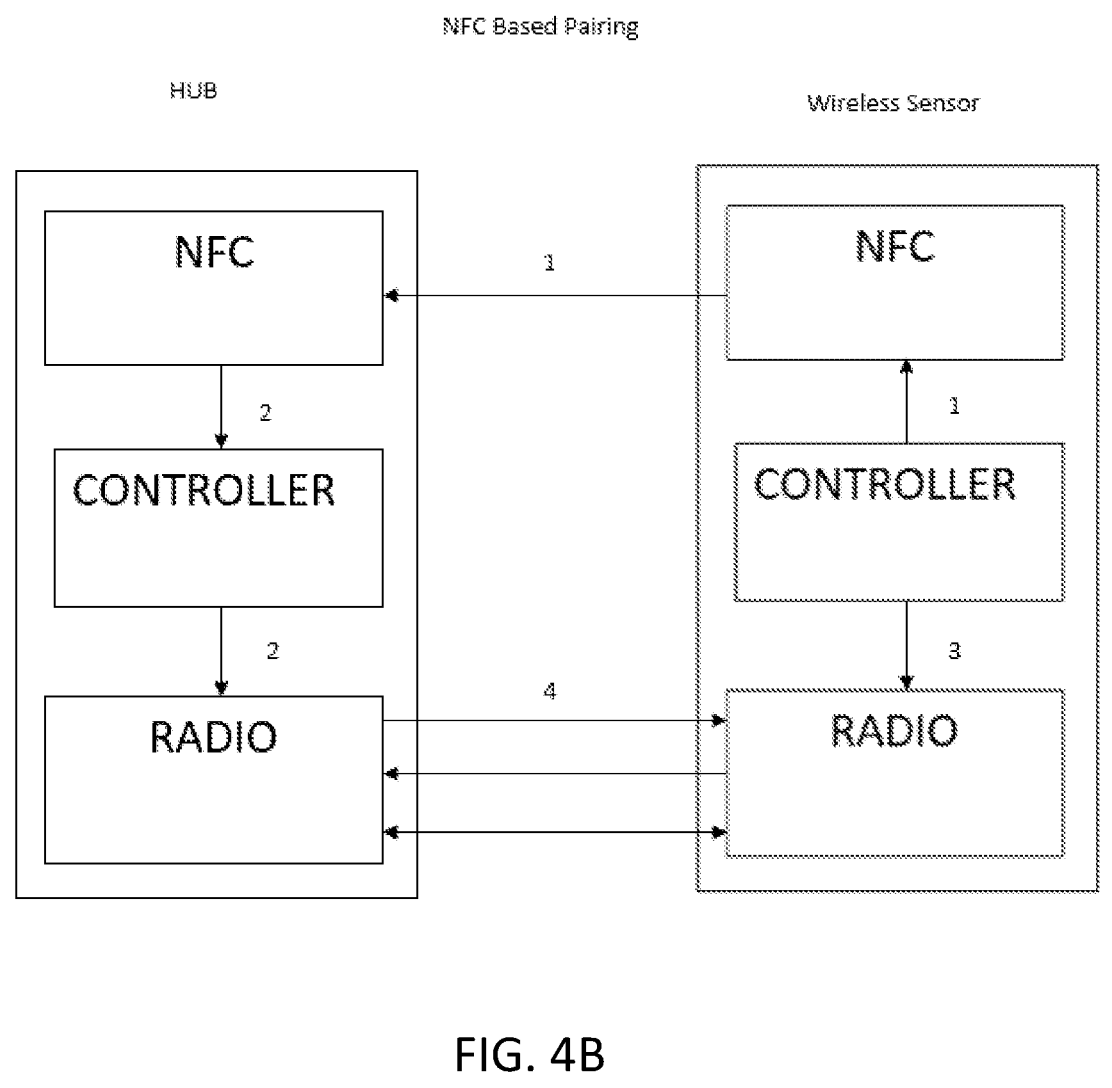

FIG. 4A is a flowchart of a process of pairing a first and a second device based on a pre-shared token communicated using NFC, according to an example. FIG. 4B is diagram showing a process of the first and the second device pairing based on the pre-shared token communicated using NFC, according to an example. The patient monitoring sensors 202B may use the technique shown in FIGS. 4A and 4B to pair with the patient monitoring hub 206. As shown in FIG. 3B, both the patient monitoring hub 206 and the patient monitoring sensor 202B may include a NFC transceiver and associated antenna. As such, these devices can wirelessly pair over the radio antenna, which provides long distance communication, based on information obtained using NFC communication. For the following disclosure, either of the patient monitoring sensor 202B or the patient monitoring hub 206 may act as the first device in FIGS. 4A and 4B, with the other of the two acting as the second device.

Since NFC communication is limited to a short distance (i.e. ~1 to 2 inches), communication between two devices using NFC is only possible when the device are in a very close proximity to each other. Using this principle, by moving the patient monitoring sensor 202B close to the patient monitoring hub 206, information can be shared between only the patient monitoring sensor 202B and the patient monitoring hub 206—assuming no other devices are within the short NFC communicating distance.

At operation 402, a controller of the first device generates an NFC token for sharing with the second device. The NFC token may be a unique connection token for distinguishing a radio link from others. For example, the token may contain device specific information about the patient monitoring device 202B as well as unique connection information that can be used to create a radio link between the two devices.

At operation 404, the first device and the second device may be moved to within near field communication range. For example, a care team member may hold the patient monitoring sensor 202B by a designed NFC area of the patient monitoring hub 206. Alternatively, in a scenario when the patient monitoring sensor 202B is attached to the patient, the patient monitoring hub 206, or an NFC portion thereof, may be moved proximate to the patient monitoring sensor 202B by the patient care provider.

At operation 406, once they first device and the second device are within NFC range, the NFC token may be sent from the first device to the second device using the NFC transceivers of the devices. For example, the patient monitoring sensor 202B may transmit the NFC token to the patient monitoring hub 206.

At operation 408, a radio link may be established between the first device and the second device based on information provided by the NFC token to pair the first and second device via longer distance radio communication. For example, the patient monitoring sensor 202B and patient monitoring hub 206 may pair via a radio link (e.g. Bluetooth™) connection using the unique, connection specific information in the NFC token.

At operation 410, data may be transmitted between the paired first device and second device through the radio communication link. For example, patient parameter information measured by the patient monitoring sensor 202B may be sent to the patient monitoring hub 206 over the radio communication link. As another example, information for adjusting the setting of the patient monitoring sensor 202B may be sent from the patient monitoring hub 206 to the patient monitoring sensor 202B. However, these examples a not limiting and other types of data can be transferred between the devices.

Figure 5A:
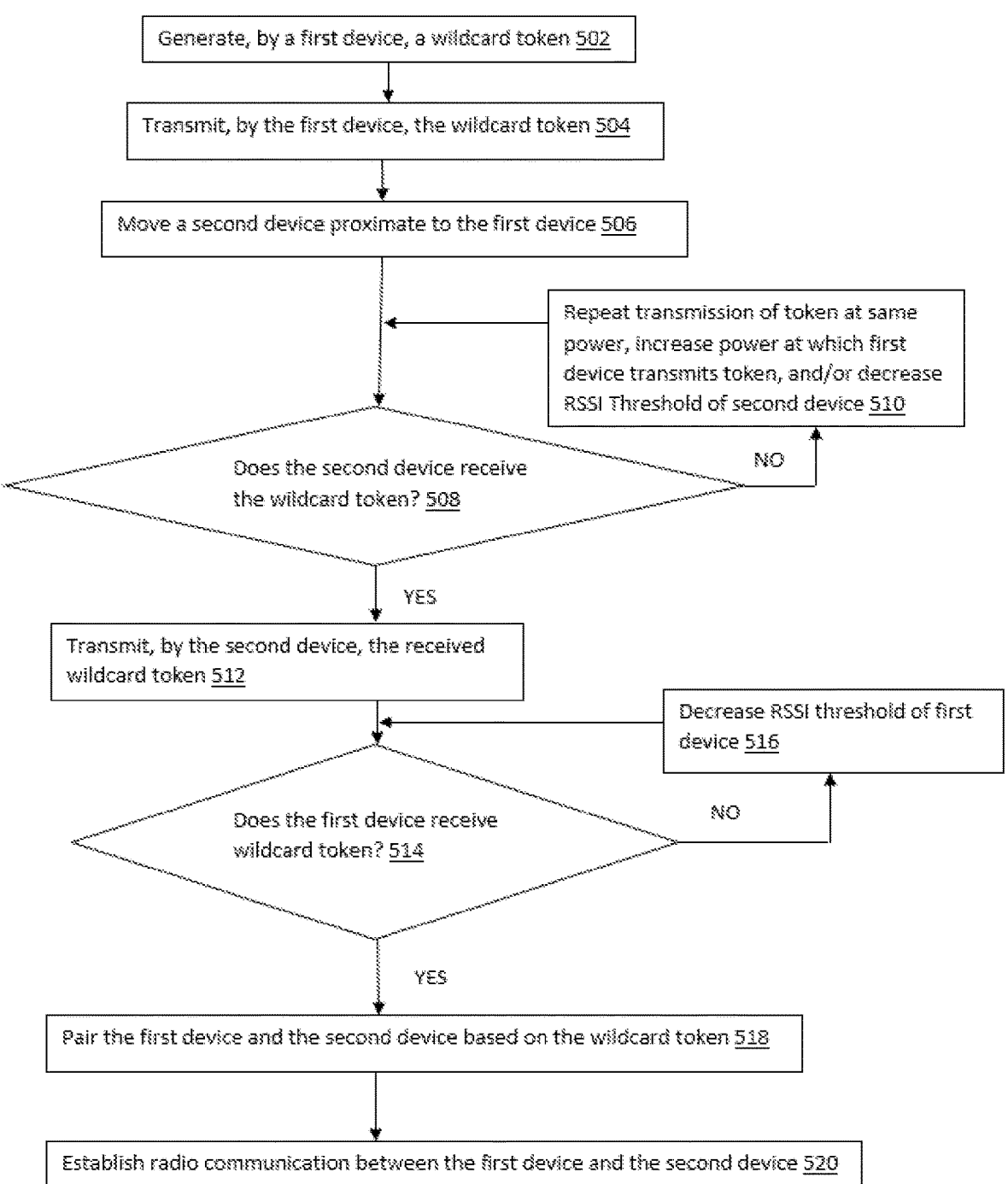
FIG. 5A is flowchart of a process 500 of pairing a first and a second device using proximity based pairing, according to an aspect of the disclosure.
Figure 5B:
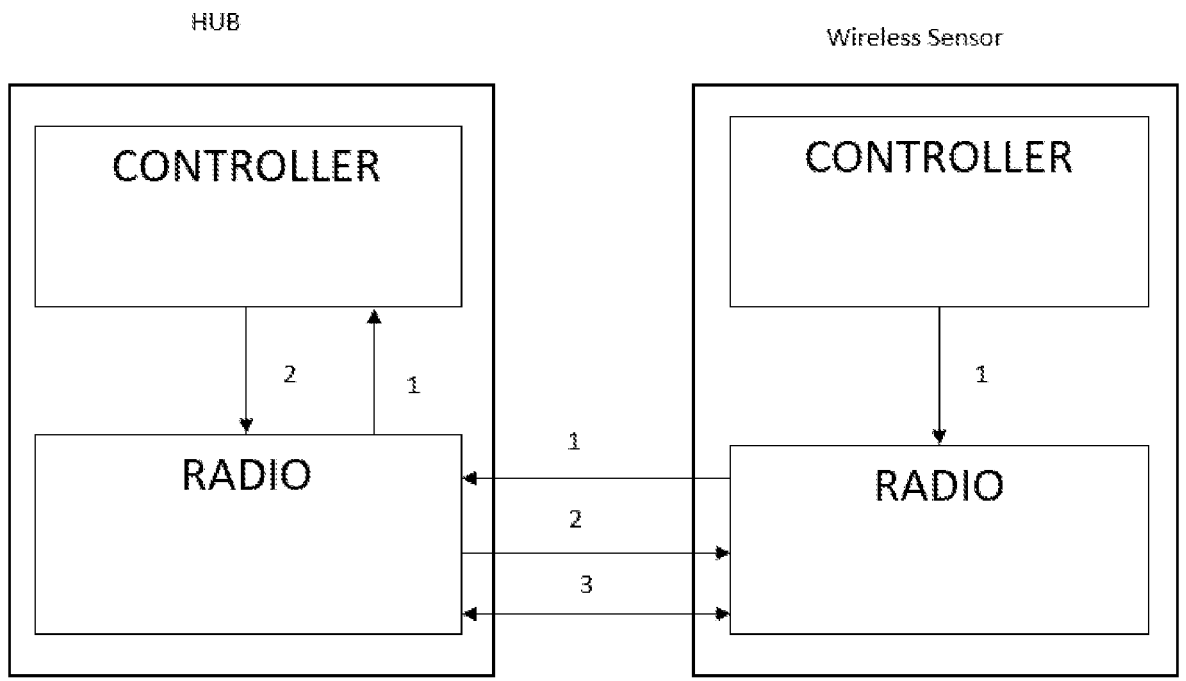
FIG. 5B is diagram showing the process 500 of pairing the first and the second device using proximity based pairing, according to an aspect of the disclosure.

FIG. 5A is flowchart of a process 500 of pairing a first and a second device using proximity based pairing, according to an example. FIG. 5B is diagram showing the process 500 of pairing the first and the second device using proximity based pairing, according to an example. The patient monitoring sensors 202A may use the technique shown in FIGS. 5A and 5B to pair with the patient monitoring hub 206. As shown in FIG. 3B, the patient monitoring sensor 202A may not include an NFC transceiver. As such, the patient monitoring sensor 202A may not be able to pre-share a token for establishing a radio link using NFC. For the following disclosure, either of the patient monitoring sensor 202A or the patient monitoring hub 206 may act as the first device in FIGS. 5A and 5B, with the other of the two acting as the second device.

At operation 502, the first device may generate a wildcard token. The wildcard token includes unique information that may be used for pairing two device. The wildcard token may be a special token that is defined by the communication protocol. When a node device receives a connection offer with the wildcard token (or information corresponding thereto) in it, the node automatically accepts the offer and link formation can continue. In contrast to the wildcard token, with the pre-shared token, the node device needs to do token matching to verify that the right sensor is paired.

At operation 504, the first device may wirelessly transmit the wildcard token via radio communication. For example, the first device may transmit a connection offer at low power that includes the wildcard token. That is, the radio frames used in the connection establishment phase may be sent with minimal transmit power, thus making the effective pairing range a short distance. The power level may be set to a level that only offer connections to devices within a short distance of the first device. By offering connections for only a short distance from the first device, unintended connections can be avoided based on locations of surrounding devices. For example, when the second device is a sensor that is not connected to the patient, the power level may be set to a level that only offers connections to devices within 6 inches. As such, the second device can be connected by a care team member holding the unconnected second device near the first device.

The power level can be set based on the situation. For example, when the second device is a sensor that is attached to the patient, the power level may be set to a higher level than described above since the care team member may not be able to move the second device within 6 inches of the first device. A care team member may select a transmit power level by selecting a distance, a power level, or a type of device intended to be connected. The power level may also be determined by the first device. For example, the first device may detect its location (e.g. location in a hospital or room type) and set the power level based on the location.

According to an embodiment, proximity based pairing may be controlled by an RSSI threshold on the first device or the second device. In this embodiment, the wildcard token may be transmitted at standard or full power by the first device.

One or more of the transmit power of the first device, the RSSI threshold of the second device, and the RSSI threshold of the first device may be adjusted to set the pairing range.

At operation 506, the second device may be moved within a short range of the first device to initiate the connection.

At operation 508, it is determined whether the second device receives the wildcard token. This determination may be made by the first device not receiving the wildcard token from the second device. For example, the determination may be based on a time period beginning from a point in time at which the pairing mode was initiated by the care team member. Based on the first device not receiving the wildcard token from the second device within this time period, the first device may determine that the second device has not received the wildcard token. Based on the first device receiving the wildcard token from the second device within this time period, the first device may determine that the second device has received the wildcard token.

At operation 510, transmission of the wildcard token by the first device may be repeated at a same power level, the power at which the first device transmits the wildcard token may be increased, and/or the received signal strength indicator (RSSI) threshold of the second device may be lowered.

When it has been determined that the second device is not receiving the wildcard token (or information corresponding thereto), the range at which the connection is offered can be increased to include the second device. The second device's ability to receive the wildcard token may also be adjusted by adjusting the RSSI threshold. By lowering the RSSI threshold, the second device will accept a wildcard token transmitted at a lower power.

The adjustments of operation 510 may be performed automatically by the devices. For example, once the time period beginning from the point in time at which the pairing mode was initiated by the care team member ends, the first device may automatically increase the transmission power. Similarly, once a time period beginning from the point in time at which the pairing mode was initiated on the second device by the care team member ends, the second device may automatically decrease the RSSI threshold.

The RSSI threshold of the second device may be calibrated and set at a time of manufacturing. According to an embodiment, the first device may broadcast a message which informs the second device at which level to set the RSSI threshold. The RSSI threshold for the first device may be adjusted in a similar manner as the transmission power of the wildcard token.

Operations 508 and 510 may be repeated until the second device receives the wildcard token. Each time the operations are repeated, the transmission power may be increased incrementally and/or the RSSI threshold may be decreased incrementally.

At operation 512, once the second device receives the wildcard token, the second device may transmit the wildcard token in a reply to the connection offer of the first device. The second device may transmit the wildcard token at standard or full transmission power to ensure that the first device is easily able to receive the wildcard token. Alternatively, the second device may transmit the wildcard token at a reduced power to control the pairing range.

At operation 514, it is determined whether the first device receives the wildcard token from the second device.

At operation 516, the RSSI threshold of the first device may be lowered. This will allow the first device to accept communications having a lower signal strength. As such, this adjustment may increase the reception range of the first device, thus increasing the proximity paring distance to include additional devices.

According to an embodiment, one or more of the transmit power of the first device, the transmit power of the second device, the RSSI threshold of the first device, and the RSSI threshold of the second device may be adjusted to set the pairing range.

When in pairing mode, the first device is actively receiving wireless transmissions and pairing requests. As such, the first device is able to receive a wireless transmission, which may be a reply to the connection offer, from the second device which includes the wildcard token. The first device may search this received data for the wildcard token to determine which device to pair with. According to an embodiment, the first device may always be in a pairing mode when operational.

At operation 518, based on receiving the wildcard token from the second device, the first device may pair with the second device. The wildcard token (or information corresponding thereto) may be used as the connection token establishing the paired connection between the first device and the second device.

At operation 520, once the first and second device are paired, radio communication between the first device and the second device may be established. According to an embodiment, the radio communication may be used to transmit physiological information corresponding to a patient as well as information corresponding to the first and second devices. In a case where the radio transmission power was decreased to transmit the wildcard token, once the radio communication has been established, the transmission power of the first device may be increased to standard or full power so the first device and second device can communicate under normal operating conditions.

The method 500 enables one to selectively pair single radio nodes with nearly the same spatial granularity as with NFC based approaches.

FIG. 6 is a flowchart of a process of pairing wireless patient monitoring sensors having different connection methods with a patient monitoring hub using a single workflow, according to an aspect of the disclosure. This process is not limited to patient monitoring sensors and patient monitoring hubs. Rather, these devices are used for explanatory purposes, and this process can be used for any hub that can wirelessly connect to multiple devices through different pairing methods.

At operation 602, the patient monitoring hub 206 may receive a pairing request from a care team member. The care team member may input the pairing request when trying to wirelessly pair a wireless medical device, such as one of the wireless patient monitoring sensors 202A, 202B, 202C, 202D. The pairing request may be made through the user interface of the patient monitoring hub 206. The user interface may include the touchscreen display 208, a button on a housing of the patient monitoring hub 206, a microphone for receiving voice commands, as well as other components capable of user interaction or receiving data corresponding to a user interaction.

For example, a care provider may order SPO2 monitoring of a patient based on the patient's symptoms. In response to this order, a member of the care team may obtain a wireless SPO2 sensor to monitor that patient's blood oxygen levels. The wireless SPO2 sensor may be a disposable sensor which includes a radio transceiver but does not include an NFC transceiver due to size and/or cost constraints. In order for the SPO2 sensor to communicate the patient monitoring hub 206, it must be wirelessly paired. As such, to initiate this process, the care team member may input a pairing request into the patient monitoring hub 206 as well as the wireless SPO2 sensor.

As another example, a care provider may order ECG monitoring of a patient based on the patient's symptoms. In response to this order, a member of the care team may obtain a wireless ECG sensor to monitor the patient. The wireless ECG sensor may be a reusable sensor which includes a radio transceiver and an NFC transceiver. In order for the ECG sensor to communicate the patient monitoring hub 206, it must be wirelessly paired. As such, to initiate this process, the care team member must input a pairing request into the patient monitoring hub 206.

According to an embodiment, operation 602 may be optional. For example, the patient monitoring hub 206 may always be in a pairing mode when operational. As such, a device pairing request may not be required to initiate pairing. Rather, pairing may be initiated by moving a device within a pairing range of the hub 206. The hub 206 may request the user to confirm the pairing before the device and the hub 206 are paired.

At operation 604, once the pairing request has been made, the patient monitoring hub 206 may transmit a wildcard token from the radio transceiver 312 (such as in a connection offer), search for a pre-shared token, and search for the wildcard token using the radio transceiver. Searching for the pre-shared token may be performed using an NFC transceiver as well as by other means described herein.

The wildcard token may include unique information that may be used for pairing two device. The wildcard token may be generated by the patient monitoring hub 206 or may be obtain from a list on the patient monitoring hub. The wildcard token may be included in a connection offer provided by the patient monitoring hub 206.

The wildcard token may be transmitted at a power level set based on a desired pairing range. Decreasing the size of an area in which the wildcard token is transmitted allows a care team member greater control over which devices are within receiving range. Based on this, a wildcard token can be transmitted only to the device that that care team member is trying to connect to patient monitoring hub 206. For example, the power level of the radio transceiver 312 of the patient monitoring hub can be set so only devices within one foot of the radio transceiver 312 will receive the wildcard token. In most cases, this one-foot area will not include any wireless devices that are in a pairing mode. Accordingly, when the care team member moves the wireless device he/she is attempting to pair within the one foot range of the transceiver 312, it will be the only device capable of receiving the wildcard token. In some cases, the desired pairing range of wildcard token may be limited to essentially same range as paring range of NFC. Pairing range can be adjusted by either controlling the transmit power or RSSI limit. The transmit power and RSSI limit can be adjusted in hub, in the wireless device or in both. In some cases, the transmit power and/or RSSI limit is configured based on manufacturing calibration. In some cases, the pairing with wildcard token may require touching with the wireless device the hub to certain marked position in a predetermined orientation. To guide the orientation and/or position there can be marked a pairing hot spot or pairing slot in the hub.

In some cases, the power level can be adjusted either automatically or manually. For example, when the care team member is trying to pair a portable sensor that is not attached to the patient, the care team member is able to move the sensor close to the patient monitoring hub 206. In this situation, the care team member can set the transmit power to a level which provides a pairing range of 1 foot. By selecting the smaller pairing range, the chances of undesired devices receiving the wildcard token is low. According to another example, when a care team member is trying to pair a sensor that is attached to the patient, the care team member may set the transmit power to a level which provides a pairing range of 3 feet since the location of the sensor is constrained by the attached patient.

The transmit power may be adjusted through the user interface of the patient monitoring hub 206. According to an embodiment, the transmit power may be set based on a desired range or by selecting the type of device that is being connected. For example, since an ECG monitor may be difficult to disconnect from and reconnect to the patient, selection of an ECG sensor may result in a transmit power providing a 3 foot range. Since SPO2 monitors are easily removable from the patient, selection of a SPO2 monitor may result in a transmit power providing a 1 foot range.

According to an aspect of the disclosure, the patient monitoring hub 206 may automatically adjust radio transmission power level based on a type of device detected in the area. Sensors in a pairing mode may transmit information that indicates the type of the device. Based on this information, the patient monitoring hub 206 can adjust the transmit power. For example, if the patient monitoring hub 206 detects an ECG sensor trying to pair, the hub may set the transmit power to provide a pairing range of 3 feet. Alternatively, if the patient monitoring hub 206 detects a SPO2 sensor trying to pair, the hub may set the transmit power to provide a pairing range of 1 foot. In a case where the patient monitoring hub 206 detects multiple sensors trying to pair, the transmit power level may be set to the lowest of the group or the power level of a predesignated priority device.

The patient monitoring hub 206 may automatically adjust radio transmission power level based not receiving a token when in a pairing mode. For example, when the patient monitoring hub 206 transmits a wildcard token for a preset period of time without receiving a transmission including the wildcard token, the patient monitoring hub 206 may increase the radio transmission power to increase the connection radius in an attempt to reach a device. This process may be incrementally repeated until the patient monitoring hub 206 receives a transmission including the token. Similarly, the patient monitoring hub 206 may decrease the radio transmission power when multiple devices are replying with the wildcard token. In another embodiment, when multiple devices are replying with the wildcard token the patient monitoring hub 206 may establish connection with the device sending the wildcard token with highest RSSI.

According to another aspect of the disclosure, the radio transmission power level may be automatically adjusted by the patient monitoring hub 206 based on its location. Specifically, the patient monitoring hub 206 may detect its location using methods known in the art and set the radio transmission power level based on the location. For example, if the patient monitoring hub 206 detects that it is within a first intensive care unit (ICU) it may set the radio transmission power level to a first value and if the patient monitoring hub 206 detects that it is within a second ICU it may set the radio transmission power level to a second value.

The patient monitoring hub 206 may search for the wildcard token using the radio transceiver 312. When a wireless device in a pairing mode receives the transmitted wildcard token, in response to the connection offer, the wireless device may send a reply to the connection offer which includes the wildcard token. The wireless transceiver 312 may be operating in a state in which it can receive the pairing request and forward it to the processor 304 for analysis. The processor 204 may process all of the information received through the radio transceiver 312 to find the reply including the wildcard token.

Each medical device having NFC communication capabilities may be assigned a unique connection token. The radio transceiver 312 of the patient monitoring hub 206 may pair with a specific medical device based on the unique connection token received from the medical device though NFC communication.

For example, a SPO2 sensor may be assigned a unique connection token. In response to the patient monitoring hub 206 detecting the unique token through the NFC transceiver 310, the patient monitoring hub 206 can initiate a pairing process based on detecting the token in a pairing request, thus assuring that the device being pairing is device that was providing the NFC communication.

According to an embodiment, to provide a similar workflow for proximity based pairing and NFC based pairing, one or more of the transmit power of the radio communication transceiver, the RSSI threshold of the patient monitoring sensor, and the RSSI threshold of the patient monitoring hub may be set to a level that only offers connections to devices within a distance approximately the same as in NFC pairing, such as within a 20%, 50% or 100% difference.

At operation 606, the patient monitoring hub 206 may receive a connection token via radio communication. The connection token may be a token that was pre-shared though using NFC or the wildcard token that was transmitted by the radio transceiver 312.

At operation 608, the patent monitoring hub 206 may determine whether the received connection token is a pre-shared token or the wildcard token.

At operation 610, the patient monitoring hub 206 pair with a device associated with the received connection token. Pairing may include establishing a bi-directional communication channel between the two devices. For example, the device may be paired using a technology such as Bluetooth®, wifi, or MBAN.

For example, in a scenario in which the SPO2 sensors discussed above, which does not include NFC capabilities, is moved proximate to the patient monitoring hub 206 when both devices are in a paring mode, the SPO2 sensor may receive the wildcard token from a connection offer of the patient monitoring hub 206. The SPO2 sensor may then reply to the connection offer with the wildcard token. Since the reply includes the wildcard token, the SPO2 sensor and the patient monitoring hub 206 may pair and the radio transmitter of the patient monitoring hub 206 may revert to full or standard transmit strength for the paired communications. As such, the patient care team member is able to pair to an intended device (monitor without NFC) with the patient monitoring hub 206 when other devices are in the area and are attempting to pair, based on a proximity between the two devices intended to be paired.

According to another example, in a scenario in which the ECG sensor discussed above, which includes NFC capabilities, is moved proximate to the patient monitoring hub 206 when both devices are in a paring mode, the ECG sensor may share a connection token with the patient monitoring hub 206 via NFC. The patient monitoring hub may then offer a radio connection with the pre-shared connection token. This offer may be provided at standard power since the pre-shared token in unique, thus prevent an improper connection. The ECG sensor may then reply to the connection offer with the pre-shared connection token. Since the reply includes the pre-shared connection token, the ECG sensor and the patient monitoring hub 206 will pair. As such, the patient care team member is able to pair to an intended device (monitor with NFC) with the patient monitoring hub 206 when other devices are in the area and are attempting to pair based on the proximity of the two devices intended to be paired.

Pairing of both devices may be performed by a care team member using the same workflow. Since, upon initiating pairing mode on the patient monitoring hub 206, the wild-card token may be broadcast while the NFC transceiver is searching for a pre-shard token and the radio transceiver is searching for the wildcard token, the patient monitoring hub 206 will pair with the first device brought within the short paring vicinity. Since the patient monitoring hub 206 provides support for both pairing techniques, either type device may be paired based on which device initiates the pairing first, thus providing the same workflow for both types of pairing.

Figure 7:
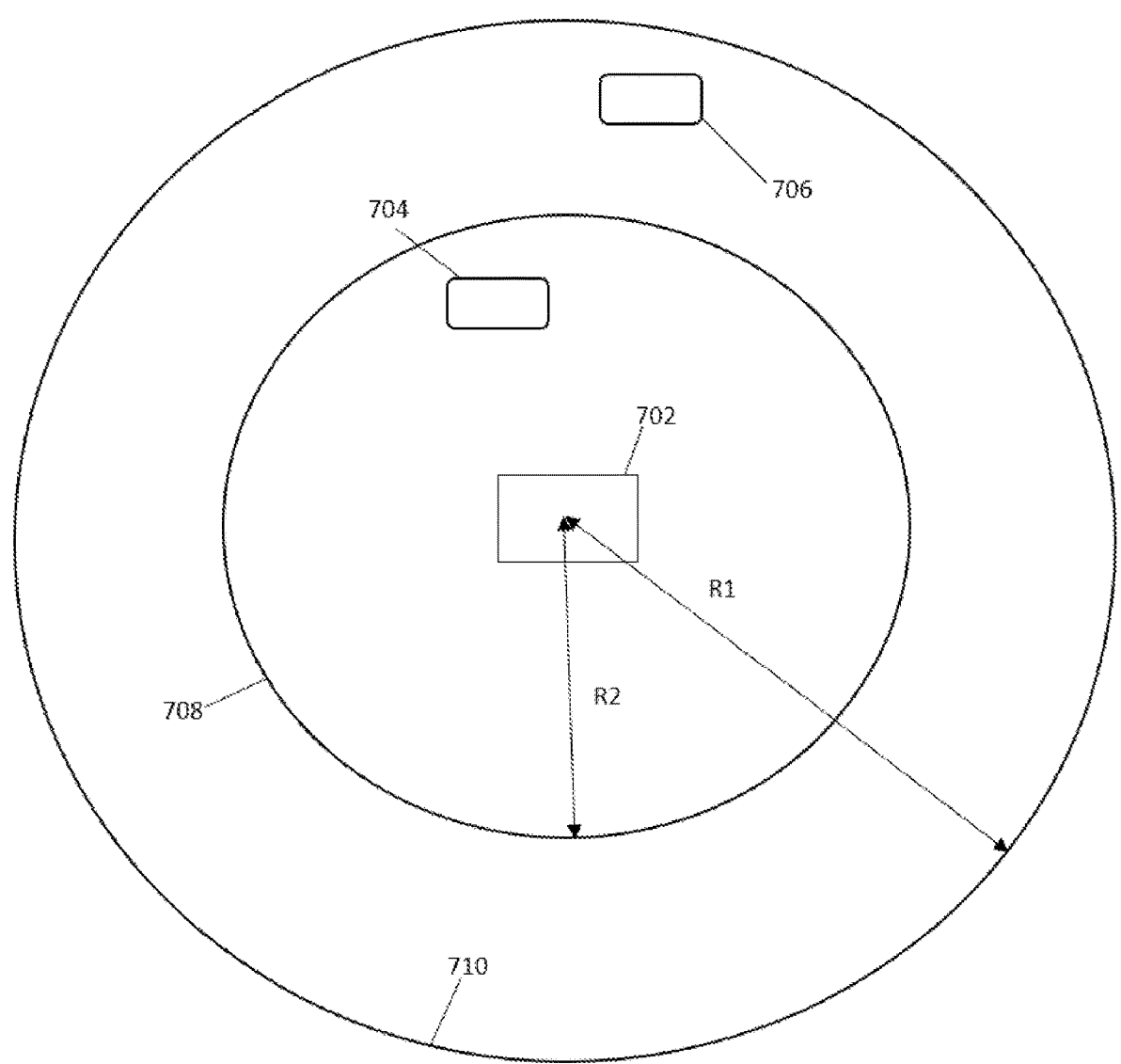
FIG. 7 is a diagram of a scenario in which a first wireless device and a second wireless device are within the wildcard token transmission range of a wireless hub.

In the above example, a single device is brought into the short initial pairing range of the patient monitoring hub 206. However, in a real-world environment, other scenarios may arise. FIG. 7 is a diagram of a scenario in which a first wireless device 704 and a second wireless device 706 are within the wildcard token transmission range R1 of a wireless hub 702. As shown in FIG. 7, wildcard token transmission range R1 of the hub 702 is large enough to reach both wireless devices 704 and 706. As such, if both the first wireless device 704 and the second wireless device 706 are in a pairing mode, both wireless devices 704 and 706 may receive the wildcard token transmitted by the hub 702 in a connection offer and replay to the offer with the wildcard token.

According to an aspect of the disclosure, when the hub 702 receives two replies to a connection offer that includes the wildcard token, the hub may reduce the wildcard token transmission range. By reducing the transmission range, the amount of devices within connection range may be reduced.

For example, a care team member may be attempting to pair the first wireless device 704 with the hub 702. However, as shown in FIG. 7, the second wireless device 706 may be within the initial wildcard token transmission range R1 of the hub 702. When the hub 702 receives two replies to its pairing request which include the wildcard token, the hub 702 may automatically transmit a second wildcard token at a smaller range R2. By reducing the range, the second wireless device 706 is not able to receive the second wildcard transmission token. Therefore, the first wireless device 704, which the care team member is intending to pair with the hub, is paired using the second wildcard. token. According to an aspect of the disclosure, the automatic reduction in wildcard transmission range may be performed periodically based on a set power a range reduction, with a new wildcard token transmitted at each reduction, until only a single wireless device (or a desired amount of devices) responds with the token.

According to an aspect of the disclosure, the hub 702 may wait a predefined time period before connecting to a device that replies to the connection offer with the wildcard token. Since it is unlikely that the first device 704 and the second device 706 will respond at the same time, the time period will provide time for each device within range to reply. As such, the hub 702 may obtain a more accurate listing of devices within the wildcard token transmission range rather than assuming the quickest responding device is the closest.

Figure 8:
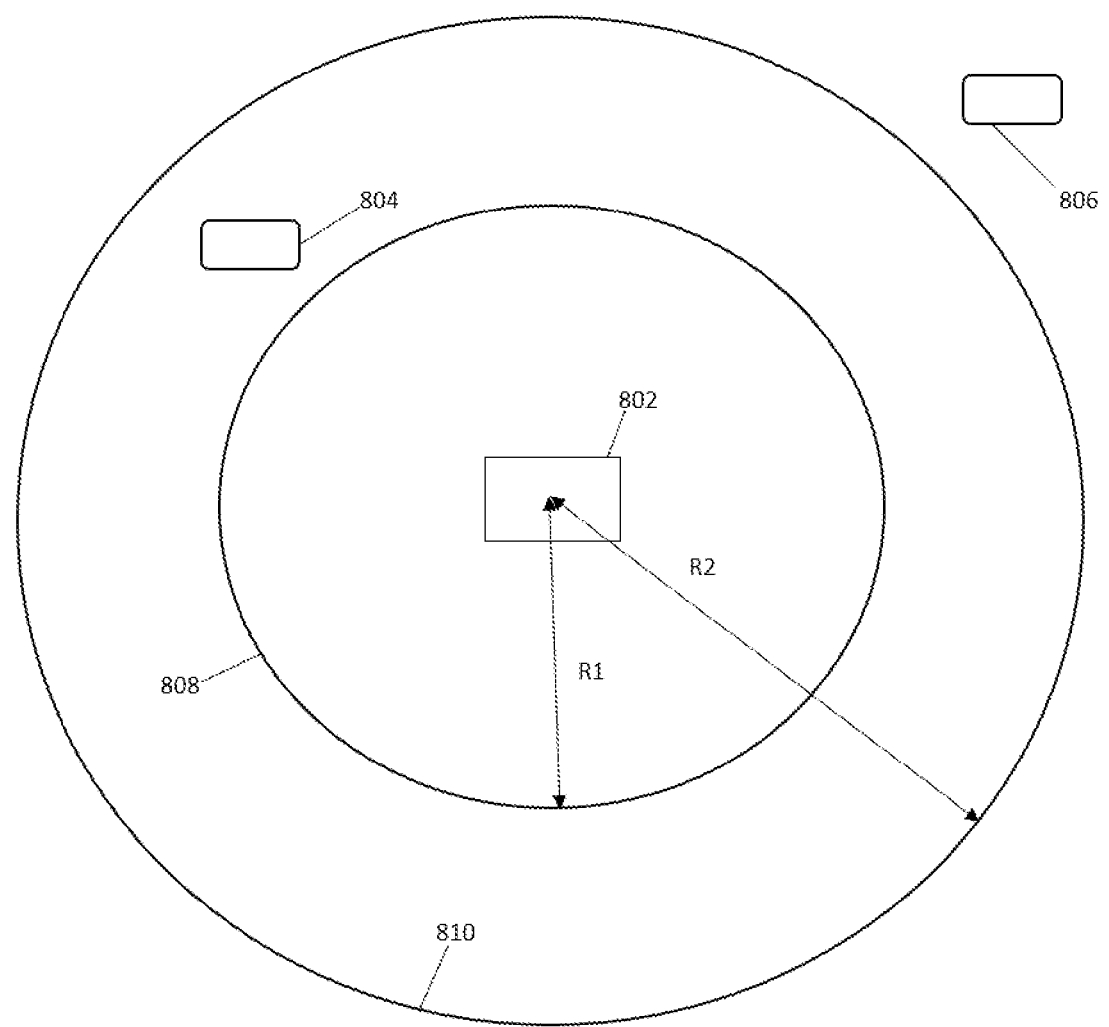
FIG. 8 is a diagram of a scenario in which a first wireless device and a second wireless device are both outside of the wildcard token transmission range of a wireless hub.

As shown in FIG. 7, the increments can be set to a level so that the hub 702 provides a wildcard token transmission range which only pairs with the first device 704 and does no pair with the slightly further away second device 706. In a scenario when the incremental decrease results in no wireless devices within the wildcard token transmission range, the power may be automatically increased by a half increment or less until only the closest device is within the wildcard token transmission range. FIG. 8 is a diagram of a scenario in which a first wireless device 804 and a second wireless device 806 are both outside of the wildcard token transmission range R1 of a wireless hub 802. As shown in FIG. 8, wildcard token transmission range R1 of the hub 802 is not large enough to reach either wireless devices 804 and 806. As such, if both the first wireless device 804 and the second wireless device 806 are in a pairing mode, both wireless devices 804 and 806 are unable to receive the wildcard token transmitted by the hub 802 in a connection offer and replay to the offer with the wildcard token.

According to an aspect of the disclosure, when the hub 802 receives no replies to a connection offer that includes the wildcard token, the hub may increase the wildcard token transmission range. By increasing the transmission range, the amount of devices within connection range may be increased.

For example, a care team member may be attempting to pair the first wireless device 804 with the hub 802. However, as shown in FIG. 8, the first wireless device 804 may not be within the initial wildcard token transmission range R1 of the hub 802. When the hub 802 receives no replies to its pairing request which include the wildcard token, the hub 802 may automatically transmit a second wildcard token at a larger range R2. By increasing the range, the first wireless device 804 is now able to receive the second wildcard transmission token. Therefore, the first wireless device 804, which the care team member is intending to pair with the hub, is paired using the second wildcard. token. According to an aspect of the disclosure, the automatic increase in wildcard transmission range may be performed periodically based on a predefined power or range increase increment, with a new wildcard token transmitted at each reduction, until only a wireless device responds with the token.

As shown in FIG. 8, the increments can be set to a level so that the hub 802 provides a wildcard token transmission range which only pairs with the first device 804 and does no pair with the slightly further away second device 806. In a scenario when the incremental increase results in multiple wireless devices within the wildcard token transmission range, the power may be reduced by a half increment or less until only the closest device is within the wildcard token transmission range.

According to an embodiment, ranges R1 and R2 may also be controlled by adjusting the RSSI thresholds of the hub and/or surrounding wireless devices in a similar manner as discussed above with respect to adjusting the transmission power of the wildcard token. For example, the ranges R1 and R2 may be controlled by one or more of adjusting the transmission power of the wildcard token from the hub, adjusting an RSSI threshold of the hub, and adjusting an RSSI threshold of a surrounding wireless device.

Figure 9:
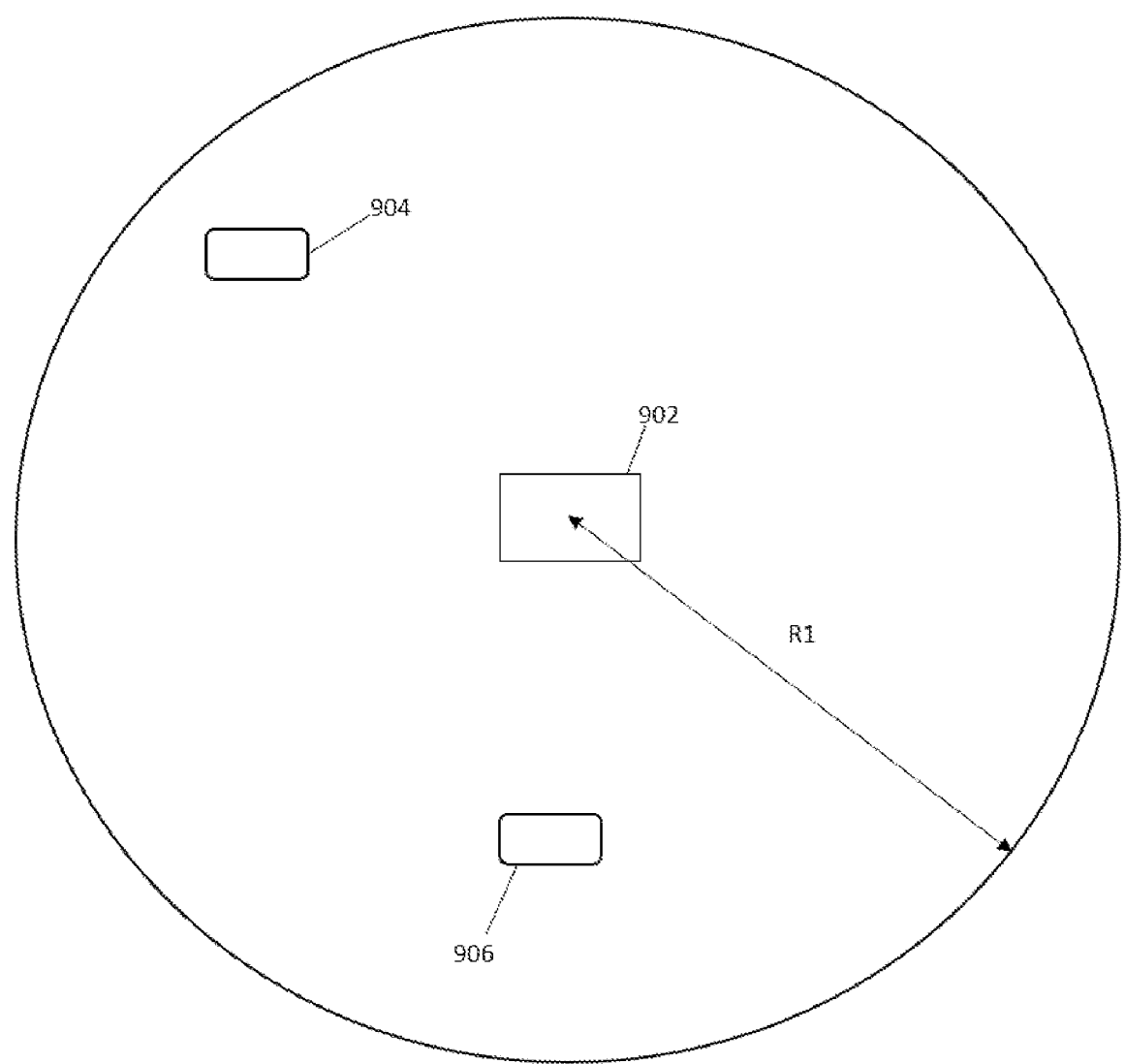
FIG. 9 is a diagram of a scenario in which a first wireless device and a second wireless device are within the wildcard token transmission range of a wireless hub.

FIG. 9 is a diagram of a scenario in which a first wireless device 904 and a second wireless device 906 are within the wildcard token transmission range R1 of a wireless hub 902. As shown in FIG. 9, wildcard token transmission range R1 of the hub 902 is large enough to reach both wireless devices 904 and 906. As such, if both the first wireless device 904 and the second wireless device 906 are in a pairing mode, both wireless devices 904 and 906 may receive the wildcard token transmitted by the hub 902 in a connection offer and replay to the offer with the wildcard token.

According to an aspect of the disclosure, in response to receiving two replies that include the wildcard token, the hub 902 may present a user with an option to select one of the two devices for paring. For example, the hub 902 may include a user interface, such as a screen, on which a window pops-up to request a pairing selection. The wireless devices may include identifying information in their pairing reply to help a user distinguish between the devices when selecting. For example, in replying to the hub's 902 offer request, the wireless devices may provide information indicating a type of device (e.g. ECG sensor, SPO2 sensor, etc.). The hub 902 may then provide this information during the selection process. For example, the type of sensor may be provided next the pairing devices in the pop-up window. Providing the device type in the reply is not intended to be limiting, but is merely used as an example. Other information may be provided in the reply of the wireless devices for distinguishing the devices such as a color or number on the device.

For example, in the scenario shown in FIG. 9, if the first wireless device 904 is an SPO2 sensor and the second wireless device 906 is a blood pressure sensor, the hub 902 may generate a pop-up window indicating two device for pairing with on listed as an SPO2 sensor and the other listed as a blood pressure sensor. The user would then be able to pair with one or more desired wireless device by selecting the devices. When more than two devices are within wildcard token transmission range, a user may select any or all of the device for pairing.

According to another aspect of the disclosure, based on the hub 902 receiving replies including the wildcard token from two devices, the hub 902 may pair with the device having the highest RSSI.

In the above embodiment, NFC communications is used as a non-limiting example of a method of pre-sharing a connection token. According to other embodiments, the pre-shared token may be shared using means such as a bar code or QR code, infrared or invisible light, through manual entry into a user interface, a hard coded connection token, an MBAN node advertisement with a verification code, and sensor discovery via an iBecon. Any or all of these pre-sharing methods may be used by a hub in conjunction with proximity based pairing. Accordingly, in the above discussed pairing process 600, the pre-shared token may be pre-shared using any of the above means of sharing.

According to aspect of the disclosure an electronic device may include a radio communication transceiver; a memory storing instructions; and at least one processor configured to execute the instructions to: transmit a first wildcard token from the radio communication transceiver at a first power level, search for a pre-shared token, and search for the wildcard token using the radio communication transceiver; responsive to receiving information corresponding to the first wildcard token from a first device, pairing with the first device via radio communication based on the information corresponding to the first wildcard token; responsive to receiving information corresponding to the pre-shared token from a second device, pairing with the second device via radio communication based on the information corresponding to the pre-shared token; and based on pairing with one or more of the first device and the second device, establish radio communication via the radio communication transceiver at a second power level.

According to an aspect of the disclosure, the at least one processor may be further configured to, based on receiving information corresponding to the first wildcard token from the first device and a third device: control a user interface to provide a window for selecting one or more of the first device and the third device; responsive to receiving a selection of the first device through the user interface, pairing with the first device based on the information corresponding to the first wildcard token; and responsive to receiving a selection of the third device through the user interface, pairing with the third device based on the information corresponding to the first wildcard token.

According to an aspect of the disclosure, the at least one processor may be further configured to, based on not receiving information corresponding the first wildcard token and not receiving information corresponding to the pre-shared token over a preset time period: increase a transmit power level of the first wildcard token; and/or decrease a received signal strength threshold for searching for the wildcard token using the radio communication transceiver.

According to an aspect of the disclosure, the at least one processor may be further configured to: based on receiving information corresponding to the first wildcard token from both the first device and a third device within a preset time period: transmit a second wildcard token at a decreased power level from the radio communication transceiver; responsive to receiving information corresponding to the second wildcard token from the first device, establish a connection with the first device based on the information corresponding to the second wildcard token; and responsive to receiving information corresponding to the second wildcard token from the third device, establish a connection with the third device based on the information corresponding to the second wildcard token.

According to an aspect of the disclosure, the at least one processor may be further configured to, based on receiving information corresponding to the first wildcard token from the first device and a third device within a preset time period: determine a received signal strength for the first device and the third device; and establish a connection using the first wildcard token based on a device having a higher signal strength.

According to an aspect of the disclosure, the at least one processor may be further configured to, responsive to receiving the pairing request, waiting a preset time period before initiating a procedure for establishing a connection.

According to an aspect of the disclosure, the at least one processor may be further configured to, based on receiving information corresponding to the first wildcard token from the first device and receiving information corresponding to the pre-shared token from a second device during the preset time period: control a user interface to provide a window for selecting one or more of the first device and the second device; responsive to receiving a selection of the first device through the user interface, establish the connection with the first device based on the information corresponding to the first wildcard token; and responsive to receiving a selection of the second device through the user interface, establish a connection with the second device based on the information corresponding to the pre-shared token.

According to an aspect of the disclosure, the at least one processor may be further configured to, based on receiving information corresponding to the first wildcard token from the first device and receiving information corresponding to the pre-shared token from a second device during the preset time period, control the user interface to include identifying information corresponding to the first device and identifying information corresponding to the second device within the window.

According to an aspect of the disclosure, the at least one processor may be further configured to: receive a device type identifier from the first device; and set a transmit power level of the wildcard token based on the device type identifier.

According to an aspect of the disclosure, the at least one processor may be further configured to: detect one or more of a location of the electronic device and a room type in which the electronic device is located; and set, based on a result of the detection, one or more of a broadcast power of the wildcard token and a received signal strength threshold for searching for the wildcard token.

According to an aspect of the disclosure, the first power level may correspond to a reduced power level and the second power level corresponds to full power of the radio communication transceiver.

According to an aspect of the disclosure, the electronic device may further include a near field communication transceiver. The at least one processor may be further configured to search for the pre-shared token using the near field communication transceiver.

According to an aspect of the disclosure, the at least one processor may be further configured to: based on receiving information corresponding to the first wildcard token from both the first device and a third device within a preset time period, increase a received signal strength threshold for searching for the wildcard token using the radio communication transceiver.

According to an aspect of the disclosure, the at least one processor may be further configured to, based on not receiving information corresponding the first wildcard token and not receiving information corresponding to the pre-shared token over a preset time period, transmit a beacon for setting receive signal strength of nearby devices.

According to an aspect of the disclosure, a method of wireless pairing electronic devices may include transmitting a first wildcard token via radio communication; searching for a pre-shared token; searching for the wildcard token via radio communication; establishing a wireless connection with a first device via radio communication based on the first wildcard token in response to receiving information corresponding to the first wildcard token from the first device; establishing a wireless connection with a second device via radio communication based on the pre-shared token in response to receiving information corresponding to the pre-shared token from the second device.

According to an aspect of the disclosure, a method of wireless pairing electronic devices may include: receiving a pairing request; transmitting, at a first power level, a first wildcard token via radio communication; searching for a pre-shared token via near-field communication; searching for the wildcard token via radio communication; establishing a wireless connection with a first device via radio communication based on the first wildcard token in response to receiving information including the first wildcard token from the first device; and establishing a wireless connection with a second device via radio communication based on the pre-shared token in response to receiving information including the pre-shared token from the second device; and increasing a radio communication transmit power to a second power level in response to pairing with one or more of the first device and the second device.

According to an aspect of the disclosure, the method may further include: providing a window for selecting one or more of the first device and the third device in response to receiving information including the first wildcard token from the first device and a third device; establishing the connection with the first device based on the first wildcard token in response to receiving a selection of the first device; and establishing a connection with the third device based on the first wildcard token in response to receiving a selection of the third device.

According to an aspect of the disclosure, the method may further include increasing a transmit power level of the first wildcard token in response to not receiving information including the first wildcard token and not receiving information including the pre-shared token over a preset time period.

According to an aspect of the disclosure, the method may further include, in response to receiving information including the first wildcard token from both the first device and a third device within a preset time period: transmitting a second wildcard token at a decreased power level; establishing a connection with the first device based on the second wildcard token in response to receiving information including the second wildcard token from the first device; and establishing a connection with the third device based on the second wildcard token in response to receiving information including the second wildcard token from the third device.

According to an aspect of the disclosure, the method may further include, in response to receiving information including the first wildcard token from the first device and a third device within a preset time period: determining a received signal strength for the first device and the third device; and establishing a connection using the first wildcard token based on a device having a higher signal strength.

According to an aspect of the disclosure, the method may further include in response to receiving the pairing request, waiting a preset time period before initiating a procedure for establishing a connection.

According to an aspect of the disclosure, According to an aspect of the disclosure, the method may further include: controlling the user interface to provide the user with a window for selecting one or more of the first device and the second device in response to receiving information including the first wildcard token from the first device and receiving information including the pre-shared token from a second device during the preset time period; establishing the connection with the first device based on the first wildcard token in response to receiving a selection of the first device; and establishing a connection with the second device based on the pre-shared token in response to receiving a selection of the second device.

According to an aspect of the disclosure, the method may further include receiving a device type identifier from the first device; and setting a transmit power level of the wildcard token based on the device type identifier.

According to an aspect of the disclosure, a non-transitory computer readable medium may store instructions executable by a processor to cause the processor to: receive a pairing request; transmit, at a first power level, a first wildcard token via radio communication; search for a pre-shared token via near-field communication; search for the wildcard token via radio communication; establish a wireless connection with a first device via radio communication based on the first wildcard token in response to receiving information including the first wildcard token from the first device; and establish a wireless connection with a second device via radio communication based on the pre-shared token in response to receiving information including the pre-shared token from the second device; and increase a radio communication transmit power to a second power level in response to pairing with one or more of the first device and the second device.

According to an aspect of the disclosure, a patient monitoring system supporting multiple methods of wirelessly pairing with a physiological sensor to establish wireless communication for physiological data may include a patient monitoring device configured to wirelessly communicate with medical devices, the patent monitor comprising a processor; a first sensor configured to collect physiological data from a patient, the first sensor comprising: a sensor element; a battery; a near field communication circuit configured to exchange pairing related information with a patient monitoring device when the first sensor is brought within a first range of the patient monitoring device and a radio communication transceiver circuit configured to wirelessly send physiological data to the patient monitoring device once the first sensor is paired with the patient monitoring device; and a second sensor configured to collect physiological data from a patient, the second sensor comprising: a sensor element; a battery; and a radio communication transceiver configured to: exchange pairing related information with the patient monitoring device in response to the second sensor being brought within a second range of the patient monitoring device when the second sensor is unpaired with the patient monitoring device; and send physiological data to a patient monitor once the second sensor is paired with the patient monitoring device, wherein the at least one processor of the patient monitoring device is configured to: control a near field communication transceiver to exchange pairing related information with the first sensor; control the radio communication transceiver to: exchange pairing related information with second sensor; and receive physiological sensor measurement data from the first and second group of sensor assemblies.

According to an aspect of the disclosure, the second range may be less than 20% different than the first range.

According to an aspect of the disclosure, the second range may be controlled by one or more of adjustment of the radio communication transceiver transmit power in the patient monitor device, a received signal strength threshold of the second sensor, and a received signal strength of the patient monitoring device.

According to an aspect of the disclosure, the received signal strength threshold of the second sensor may be adjusted by the patient monitor device.

According to an aspect of the disclosure, a same workflow may be used to pair the first sensor and second sensor.

According to an aspect of the disclosure, the first sensor may be a reusable sensors and the second sensor may be a disposable sensor.

According to an aspect of the disclosure, the pairing of the first and second sensors may include bringing the sensor proximate to a pairing hot spot marked on the monitor. The near proximity may be 3 cm.

According to an aspect of the disclosure, the first and second range may be in the range of 30 cm to 50 cm.

According to an aspect of the disclosure, the second range may be calibrated with manufacturing calibration of the monitor and/or sensor radio communication transceiver transmit power.

According to an aspect of the disclosure, the second range may be calibrated with manufacturing calibration of the RSSI measurement of the monitor and/or sensor radio communication transceiver.

According to an aspect of the disclosure, the second range may be adjusted automatically based on at least on one of the sensor type, monitor type and use environment.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

We claim:
1. An electronic device comprising:
a radio communication transceiver;
a memory storing instructions; and
at least one processor configured to execute the instructions to:
transmit a connection offer including a first wildcard token from the radio communication transceiver at a first power level, search for a pre-shared token, and search for the first wildcard token using the radio communication transceiver;
responsive to receiving a reply to the connection offer including the first wildcard token from a first device, pairing with the first device via radio communication based on the reply to the connection offer including the first wildcard token;
responsive to receiving a reply to the connection offer including the pre-shared token from a second device, pairing with the second device via radio communication based on the reply to the connection offer including the pre-shared token; and
based on pairing with one or more of the first device and the second device, changing a transmission range for the transmission of the connection offer to a second power level.

2. The electronic device of claim 1, wherein the at least one processor is further configured to, based on receiving a reply to the connection offer including the first wildcard token from the first device and a third device:

control a user interface to provide a window for selecting one or more of the first device and the third device;

responsive to receiving a selection of the first device through the user interface, pairing with the first device based on the a reply to the connection offer including the first wildcard token; and responsive to receiving a selection of the third device through the user interface, pairing with the third device based on the a reply to the connection offer including the first wildcard token.

3. The electronic device of claim 1, wherein the at least one processor is further configured to, based on not receiving a reply to the connection offer including the first wildcard token and not receiving a reply to the connection offer including the pre-shared token over a preset time period:

increase a transmit power level of the first wildcard token; and/or decrease a received signal strength threshold for searching for the first wildcard token using the radio communication transceiver.

4. The electronic device of claim 1, wherein the at least one processor is further configured to: based on receiving a reply to the connection offer including the first wildcard token from both the first device and a third device within a preset time period:

transmit a second wildcard token at a decreased power level from the radio communication transceiver;

responsive to receiving a reply to the connection offer including the second wildcard token from the first device, establish a connection with the first device based on the a reply to the connection offer including the second wildcard token; and responsive to receiving a reply to the connection offer including the second wildcard token from the third device, establish a connection with the third device based on the information reply to the connection offer including the second wildcard token.

5. The electronic device of claim 1, wherein the at least one processor is further configured to, based on receiving a reply to the connection offer including the first wildcard token from the first device and a third device within a preset time period:

determine a received signal strength for the first device and the third device; and establish a connection using the first wildcard token based on a device having a higher signal strength.

6. The electronic device of claim 1, wherein the at least one processor is further configured to, responsive to receiving a pairing request, waiting a preset time period before initiating a procedure for establishing a connection.

7. The electronic device of claim 6, wherein the at least one processor is further configured to, based on receiving a reply to the connection offer including the first wildcard token from the first device and receiving a reply to the connection offer including the pre-shared token from the second device during the preset time period:

control a user interface to provide a window for selecting one or more of the first device and the second device;

responsive to receiving a selection of the first device through the user interface, establish the connection with the first device based on the reply to the connection offer including the first wildcard token; and responsive to receiving a selection of the second device through the user interface, establish a connection with the second device based on the reply to the connection offer including the pre-shared token.

8. The electronic device of claim 7, wherein the at least one processor is further configured to, based on receiving a reply to the connection offer including the first wildcard token from the first device and receiving a reply to the connection offer including the pre-shared token from the second device during the preset time period, control the user interface to include identifying information corresponding to the first device and identifying information corresponding to the second device within the window.

9. The electronic device of claim 1, wherein the at least one processor is further configured to:

receive a device type identifier from the first device; and set a transmit power level of the first wildcard token based on the device type identifier.

10. The electronic device of claim 1, wherein the at least one processor is further configured to:

detect one or more of a location of the electronic device and a room type in which the electronic device is located; and set, based on a result of the detection, one or more of a broadcast power of the first wildcard token and a received signal strength threshold for searching for the first wildcard token.

11. The electronic device of claim 1, wherein the first power level corresponds to a reduced power level and the second power level corresponds to full power of the radio communication transceiver.

12. The electronic device of claim 1, further comprising a near field communication transceiver, wherein the at least one processor is further configured to search for the pre-shared token using the near field communication transceiver.

13. The electronic device of claim 1, wherein the at least one processor is further configured to: based on receiving a reply to the connection offer including the first wildcard token from both the first device and a third device within a preset time period, increase a received signal strength threshold for searching for the first wildcard token using the radio communication transceiver.

14. The electronic device of claim 1, wherein the at least one processor is further configured to, based on not receiving a reply to the connection offer including the first wildcard token and not receiving a reply to the connection offer including the pre-shared token over a preset time period, transmit a beacon for setting receive signal strength of nearby devices.

* * * * *